(12) United States Patent
Kim et al.

(10) Patent No.: US 9,618,776 B2
(45) Date of Patent: Apr. 11, 2017

(54) ELECTRO-ABSORPTION OPTICAL MODULATION DEVICE AND METHOD OF FABRICATING THE SAME

(71) Applicant: ELECTRONICS AND TELECOMMUNICATIONS RESEARCH INSTITUTE, Daejeon (KR)

(72) Inventors: In Gyoo Kim, Daejeon (KR); Gyungock Kim, Daejeon (KR); Sang Hoon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/848,077

(22) Filed: Sep. 8, 2015

(65) Prior Publication Data

US 2016/0202504 A1   Jul. 14, 2016

(30) Foreign Application Priority Data

Jan. 14, 2015  (KR) .......................... 10-2015-0006866

(51) Int. Cl.
  *G02F 1/035*  (2006.01)
  *G02F 1/025*  (2006.01)
  *G02F 1/015*  (2006.01)

(52) U.S. Cl.
  CPC ...... *G02F 1/025* (2013.01); *G02F 2001/0155* (2013.01); *G02F 2001/0157* (2013.01)

(58) Field of Classification Search
  CPC ............ G02F 1/025; G02F 2001/0155; G02F 2001/0157

USPC .............................................................. 385/2
See application file for complete search history.

(56) References Cited

U.S. PATENT DOCUMENTS

| | | | | |
|---|---|---|---|---|
| 5,479,539 A | * | 12/1995 | Goldsmith | ......... G02B 6/12004 385/1 |
| 6,597,011 B1 | * | 7/2003 | Atanackovic | .......... B82Y 20/00 257/12 |
| 6,784,466 B2 | | 8/2004 | Chu et al. | |
| 7,830,580 B2 | * | 11/2010 | Kato | ....................... G02F 1/025 359/237 |
| 8,160,404 B2 | * | 4/2012 | Pan | ......................... G02F 1/025 385/129 |

(Continued)

FOREIGN PATENT DOCUMENTS

KR   10-2010-0064592 A   6/2010

OTHER PUBLICATIONS

Ning-Ning Feng, et al., "30GHz Ge electro-absorption modulator integrated with 3μm silicon-on-insulator waveguide", Optics Express, vol. 19, No. 8, pp. 7062-7067, Apr. 11, 2011.

*Primary Examiner* — Ryan Lepisto
*Assistant Examiner* — Guy Anderson (57) ABSTRACT

Provided is an optical modulator including an optical waveguide and an optical modulation part integrated on the optical waveguide that is clad in oxide silicon and has silicon as core by using a bulk silicon wafer in place of an silicon-on-insulator (SOI) used for a typical optical waveguide and optical modulator and using complementary metal oxide semiconductor (CMOS) and thermal oxide film formation processes, and a fabrication method thereof.

15 Claims, 8 Drawing Sheets

(56) References Cited

U.S. PATENT DOCUMENTS

| | | | |
|---|---|---|---|
| 8,300,991 B2* | 10/2012 | Kato | B82Y 20/00 257/E33.001 |
| 8,340,478 B2* | 12/2012 | Popovic | G02B 6/12002 385/2 |
| 9,110,233 B2* | 8/2015 | Kim | G02B 6/122 |
| 9,142,698 B1* | 9/2015 | Cunningham | H01L 31/02327 |
| 2003/0063362 A1* | 4/2003 | Demir | B82Y 20/00 359/240 |
| 2004/0150873 A1* | 8/2004 | Pearsall | B82Y 20/00 359/321 |
| 2006/0159381 A1* | 7/2006 | Tsuzuki | B82Y 20/00 385/1 |
| 2007/0002917 A1* | 1/2007 | Deng | H01S 5/18302 372/50.11 |
| 2008/0080803 A1 | 4/2008 | Park et al. | |
| 2009/0034904 A1* | 2/2009 | Tsuzuki | G02F 1/025 385/14 |
| 2010/0142026 A1* | 6/2010 | Kato | G02F 1/025 359/248 |
| 2010/0144075 A1 | 6/2010 | Kim et al. | |
| 2011/0243492 A1 | 10/2011 | Na et al. | |
| 2012/0057815 A1* | 3/2012 | Ezaki | G02F 1/025 385/3 |
| 2012/0070111 A1* | 3/2012 | Shin | G02F 1/025 385/2 |
| 2013/0071058 A1 | 3/2013 | Lim et al. | |
| 2013/0170784 A1* | 7/2013 | Kim | G02B 6/122 385/3 |
| 2013/0200431 A1* | 8/2013 | Coimbatore Balram | H01L 21/02381 257/183 |
| 2015/0277072 A1* | 10/2015 | Hatori | G02B 6/4207 385/14 |
| 2015/0293383 A1* | 10/2015 | Cunningham | H01L 31/02327 385/2 |
| 2015/0362764 A1* | 12/2015 | Cunningham | H01L 31/02327 385/2 |
| 2016/0109731 A1* | 4/2016 | Huang | G02F 1/015 385/3 |

* cited by examiner

ELECTRO-ABSORPTION OPTICAL MODULATION DEVICE AND METHOD OF FABRICATING THE SAME

CROSS-REFERENCE TO RELATED APPLICATIONS

This U.S. non-provisional patent application claims priority under 35 U.S.C. §119 of Korean Patent Application No. 10-2015-0006866, filed on Jan. 14, 2015, the entire contents of which are hereby incorporated by reference.

BACKGROUND

The present disclosure herein relates to an electro-absorption optical modulation device, and more particularly to, a silicon semiconductor electro-absorption optical modulation device and a method of fabricating the same.

In order to deal with a continuous increase in bandwidth according to a recent sharp increase in data communication, the miniaturization and stabilization of core optical parts are needed.

As a technology that may monolithically integrate an electronic circuit and an optical device by the application of a complementary metal oxide semiconductor (CMOS) process technology, a silicon photonics technology is significantly receiving attention. Thus, silicon or silicon on insulator (SOI) wafer based optical devices are being widely researched and developed and a technology that monolithically fabricates an active optical device and an electronic integrated circuit is being developed.

The silicon photonics technology shows a high use value in optical interconnection and typical optical communication. However, a generally used SOI wafer has constraints in the aspect of cost and technology. For example, it is expensive in comparison to a silicon wafer, and even when a CMOS IC is fabricated, it is difficult to apply a library for the silicon wafer.

The silicon photonics technology fabricating an SOI region locally on the silicon wafer is also receiving attention but it is true that integration is attempted by using an expensive SOI substrate for optical devices requiring an optical waveguide such as an optical modulator.

SUMMARY

The present disclosure provides an electro-absorption optical modulation device integrated on a bulk silicon wafer.

Tasks to be performed by the inventive concept are not limited to the above-mentioned tasks and other tasks not mentioned may be clearly understood by a person skilled in the art from the following descriptions.

An embodiment of the inventive concept provides an electro-absorption optical modulation device includes a semiconductor substrate, a first clad layer in a trench region formed in the semiconductor substrate, an optical waveguide core layer disposed spaced apart from sides of the trench region on the first clad layer and extended in a first direction, an optical modulation part disposed on the optical waveguide core layer and having an island shape, and a second clad layer covering the optical modulation part and the optical waveguide core layer.

In an embodiment, the semiconductor substrate may include a bulk silicon wafer.

In an embodiment, the optical modulation part may include a first contact layer, a depletion layer on the first contact layer, and a second contact layer on the depletion layer. The first contact layer may be extended to an outside of the depletion layer. The first contact layer may include a first semiconductor pattern, and the second contact layer may include a second semiconductor pattern. The depletion layer may include silicon (Si), germanium (Ge) or silicon germanium (SiGe).

In an embodiment, the optical waveguide core layer may be extended in a first direction. The first clad layer and the second clad layer may cover the optical modulation part and the optical waveguide core layer. The optical modulation part may have an island shape. A width of a second direction intersecting the first direction of the optical modulation part may be smaller than that of the second direction of the first clad layer.

In an embodiment, the first clad layer and the second clad layer may include silicon oxide or silicon nitride.

In an embodiment, the optical waveguide core layer may include single crystal silicon.

In an embodiments of the inventive concept, a method of fabricating an electro-absorption optical modulation device includes forming a first clad layer and an optical waveguide core layer on a surface of a semiconductor substrate, forming an optical modulation part on the optical waveguide core layer, and forming a second clad layer on the optical modulation part and the optical waveguide core layer, wherein the forming of the first clad layer and the optical waveguide core layer includes: filing a pair of first trenches with oxide, the first trenches being formed in a surface of the semiconductor substrate and extended in a first direction, and forming a second trench under the first trenches, the second trench being filled with oxide and connecting the first trenches.

In an embodiment, the forming of the first clad layer and the optical waveguide core layer may include forming a pair of the first trenches in a surface of the semiconductor substrate through an etching process, the first trenches being formed spaced apart from each other, forming oxide in the lower portion of the first trenches, forming poly silicon films on sidewalls of the first trenches, removing the oxide, forming an oxide film by performing thermal oxidation on the semiconductor substrate, and performing planarization on the oxide film.

In an embodiment, the forming of the optical modulation part may include forming a first contact layer by implanting impurities into an upper surface of the optical waveguide core layer, forming a depletion layer on the first contact layer by an epitaxial thin film growth process, and forming a second contact layer by implanting impurities into an upper surface of the depletion layer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In order for readers to sufficiently understand the configuration and effect of the inventive concept, exemplary embodiments of the inventive concept are described with reference to the accompanying drawings. The inventive concept may, however, be embodied in different forms and make various changes and should not be construed as limited to the embodiments set forth herein. The embodiments are provided to make the disclosure of the inventive concept complete and completely inform a person skilled in the art of the scope of the inventive concept. A person skilled in the art will be able to understand that the concepts of the inventive concept may be performed in any suitable environments. The same reference numerals throughout the disclosure refer to the same components.

The terms used herein are only for explaining embodiments and not intended to limit the inventive concept. The terms in a singular form in the disclosure also includes plural forms unless otherwise specified. The terms used herein "comprises" and/or "comprising" do not exclude the presence or addition of one or more additional components, steps, operations and/or devices other than the components, steps, operations and/or devices that are mentioned.

In the present disclosure, when a surface (or layer) is referred to as being 'on' another surface (or layer) or substrate, it can be directly on the other surface (or layer) or substrate, or a third surface (or layer) may also be present therebetween.

Though terms such as first, second, and third are used to describe various regions and surfaces (or layers) in various embodiments of the present disclosure, the regions and the surfaces are not limited to these terms. These terms are used only to distinguish a certain region or surface (or layer) from another region or surface (or layer). Thus, a surface referred to as a first surface in an embodiment may also be referred to as a second surface in another embodiment. Each embodiment described and illustrated herein also includes its complementary embodiment. Parts indicated by the same reference numerals represent the same components throughout the disclosure.

Also, embodiments in the present disclosure are described with reference to ideal, exemplary cross sectional views and/or plan views of the inventive concept. The thicknesses of layers and regions in the drawings are exaggerated for the effective description of technical content. Thus, the forms of exemplary views may vary depending on fabrication technologies and/or tolerances. Thus, embodiments of the inventive concept are not limited to shown specific forms and also include variations in form produced according to fabrication processes. For example, an etched region shown in a rectangular shape may have a round shape or a shape having a certain curvature. Thus, regions illustrated in the drawings are exemplary, and the shapes of the regions illustrated in the drawings are intended to illustrate the specific shapes of the regions of devices and not to limit the scope of the inventive concept.

Terms used in embodiments of the inventive concept may be construed as meanings typically known to a person skilled in the art unless being defined otherwise.

Exemplary embodiments of the inventive concept are described below in detail with reference to the accompanying drawings.

The idea of the inventive concept relates to an electro-absorption optical modulation device. More particularly, it relates to an electro-absorption optical modulation device integrated on a bulk silicon wafer and a method of fabricating the same.

Figure 1:
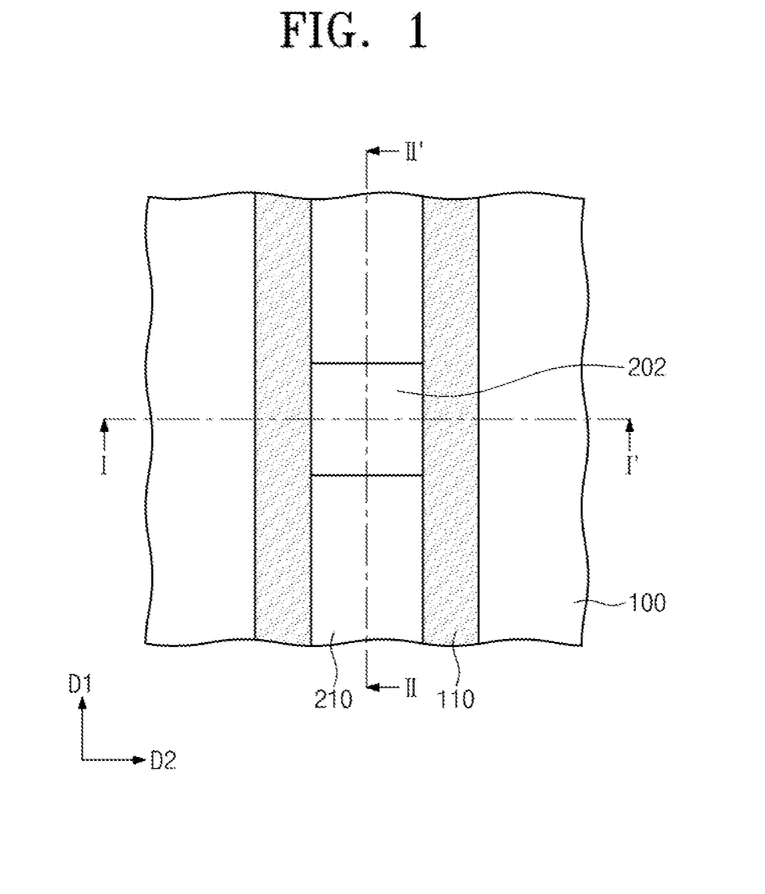
FIG. 1 is a plan view of an electro-absorption optical modulation device according to an embodiment of the inventive concept.
Figure 2:
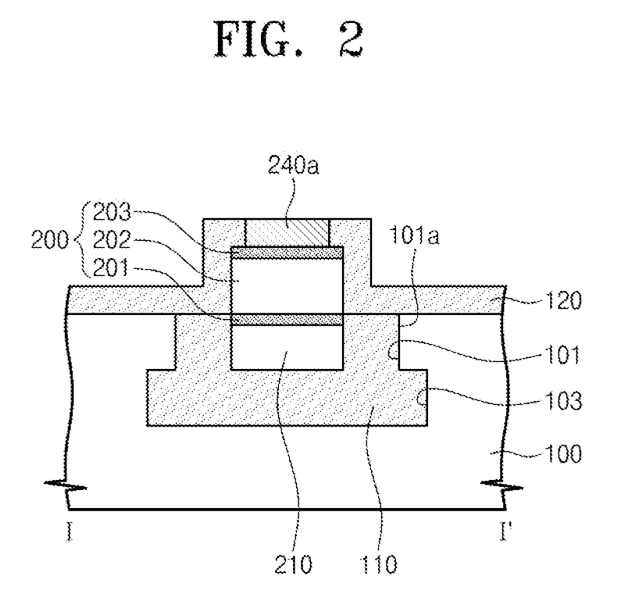
FIG. 2 is a cross-sectional view taken along line I-I' in FIG. 1.
Figure 3:
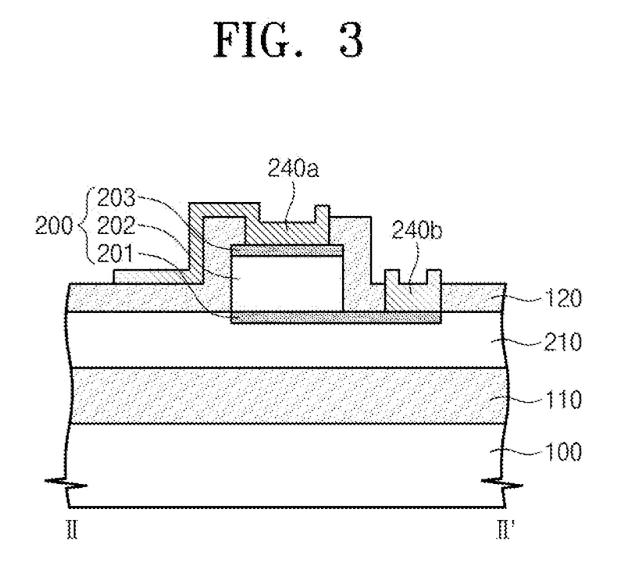
FIG. 3 is a cross-sectional view taken along line II-II' in FIG. 1.
Figure 4:
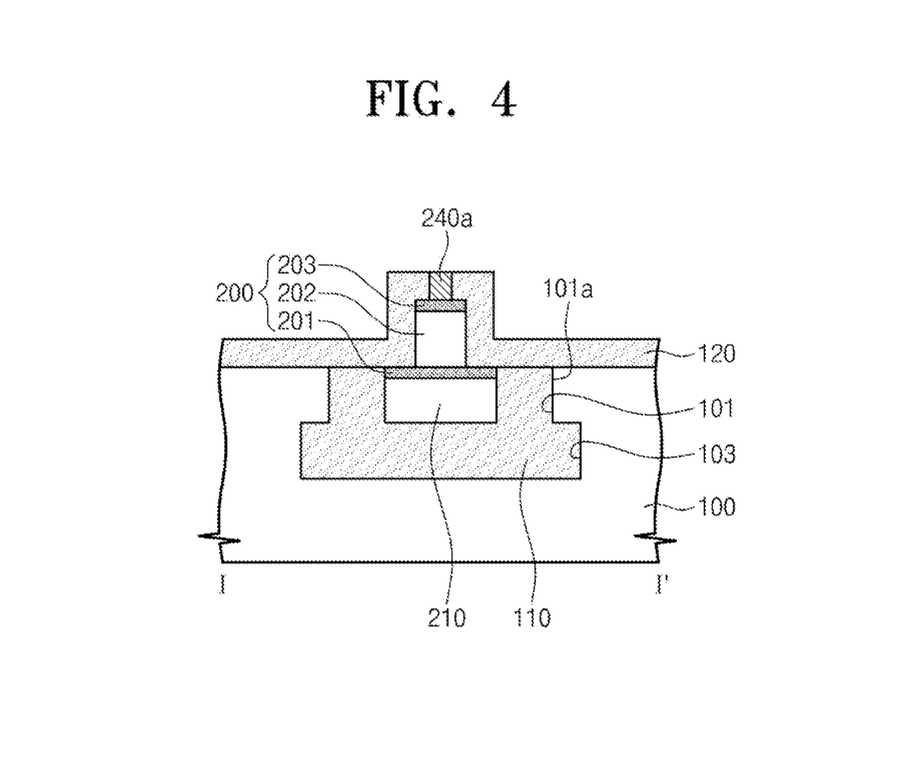
FIGS. 4 and 5 represent an electro-absorption optical modulation device according to another embodiment of the inventive concept and are cross-sectional views corresponding to line I-I' in FIG. 1.
Figure 5:
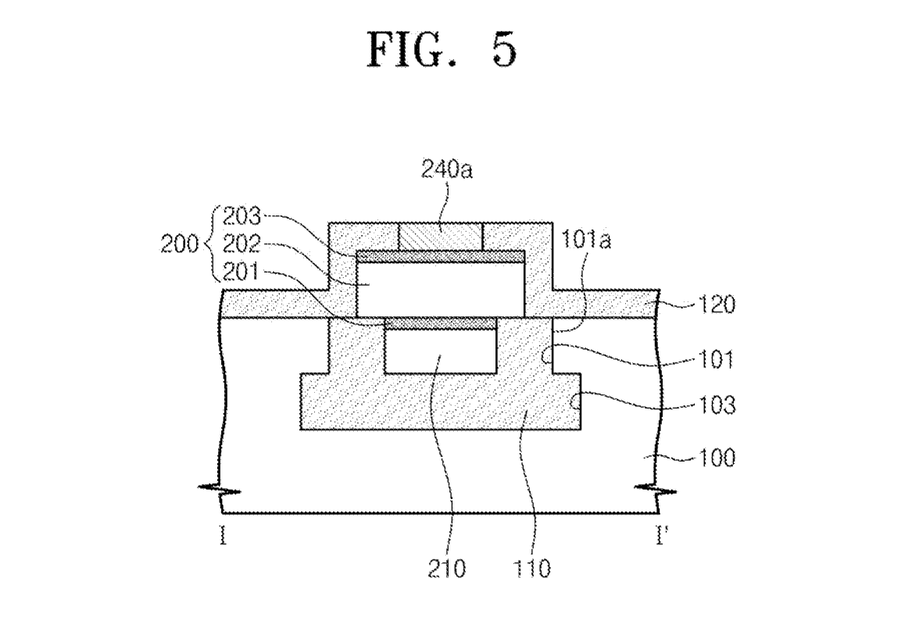

FIG. 1 is a plan view of an electro-absorption optical modulation device according to an embodiment of the inventive concept. FIGS. 2 and 3 are cross-sectional views taken along lines I-I' and II-II', respectively in FIG. 1. FIGS. 4 and 5 represent an electro-absorption optical modulation device according to another embodiment of the inventive concept and are cross-sectional views corresponding to line I-I' in FIG. 1.

Referring to FIGS. 1 to 3, a substrate 100 is provided. The substrate 100 may be a bulk substrate formed of a semiconductor material. For example, the substrate 100 may be a bulk silicon wafer. The substrate 100 may be a single crystal silicon wafer.

A first clad layer 110 may be disposed in first trenches 101 and a second trench 103 that are provided on the substrate 100. The first trenches 101 and the second trench 103 may be extended in a first direction D1. The first trenches 101 may be extended from the upper part of the substrate 100 to the inside of the substrate 100 and the second trench 103 may be formed in the substrate 100. The second trench 103 may connect the first trenches 101. The first clad layer 110 may include silicon oxide.

An optical waveguide core layer 210 may be disposed on the first clad layer 110. The first clad layer 110 may cover the lower surface and sides of the optical waveguide core layer 210. The optical waveguide core layer 210 may be disposed spaced apart from the sides 101*a* of the first trenches 101. The optical waveguide core layer 210 may be extended in the first direction D1. The refractive index of the optical waveguide core layer 210 may be higher than that of the first clad layer 110. For example, the optical waveguide core layer 210 may be single crystal silicon.

An optical modulation part 200 may be disposed on the optical waveguide core layer 210. The optical modulation part 200 may have an island shape. The width of the optical modulation part 200 may be the same as that of the optical waveguide core layer 210. Referring to FIGS. 4 and 5, the width of the second direction D2 of the optical modulation part 200 may be alternatively smaller or larger than that of the optical waveguide core layer 210.

The optical modulation part 200 may include a first contact layer 201, a depletion layer 202, and a second contact layer 203 that are sequentially stacked. The first contact layer 201 may be extended to the outside of the depletion layer 202. The first contact layer 201 may have a first semiconductor pattern. For example, the first semiconductor pattern may be an n type semiconductor pattern. The second contact layer 203 may have a second semiconductor pattern. For example, the second semiconductor pattern may be a p type semiconductor pattern. The depletion layer 202 may be germanium (Ge) or silicon germanium (SiGe).

The second clad layer 120 may be formed on the optical modulation part 200 to cover the optical waveguide core layer 210 and the optical modulation part 200. For example, the first clad layer 110 and the second clad layer 120 may cover the optical modulation part 200 and the optical waveguide core layer 210. The second clad layer 120 may have the same material as the first clad layer 110. For example, the second clad layer 120 may include silicon oxide or silicon nitride. The refractive index of the second clad layer 120 should be smaller than that of the optical waveguide core layer 210.

A first electrode 240a may be disposed on the second contact layer 203. For example, the first electrode 240a may be electrically connected to the second contact layer 203. A second electrode 240b may be disposed on the first contact layer 201. For example, the second electrode 240b may be electrically connected to the first contact layer 201.

Figure 6:
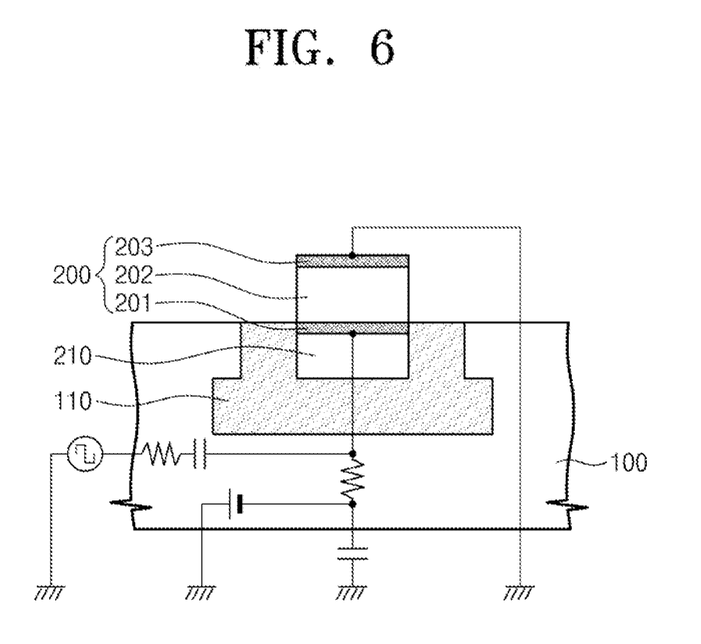
FIG. 6 is a circuit diagram of an electro-absorption optical modulation device according to an embodiment of the inventive concept.

FIG. 6 is a circuit diagram of an electro-absorption optical modulation device according to an embodiment of the inventive concept. The operating principle of the electro-absorption optical modulation device according to an embodiment is described with reference to FIG. 6. An optical signal travelling along the optical waveguide core layer 210 reaches the depletion layer 202 of the optical modulation part 200. In this case, optical coupling is performed by evanescent coupling. The intensity of the electric field of a reference signal in the depletion layer 202 is adjusted by a voltage applied to the first contact layer 201 and the second contact layer 203 and due to Franz-Keldysh effect, absorptance varies according to the intensity of an electric field applied to the depletion layer 202.

The electro-absorption optical modulation device according to an embodiment of the inventive concept may be fabricated as follows. FIGS. 7 to 13 represent the process of forming an optical waveguide on bulk silicon wafer according to an embodiment of the inventive concept.

Figure 7:
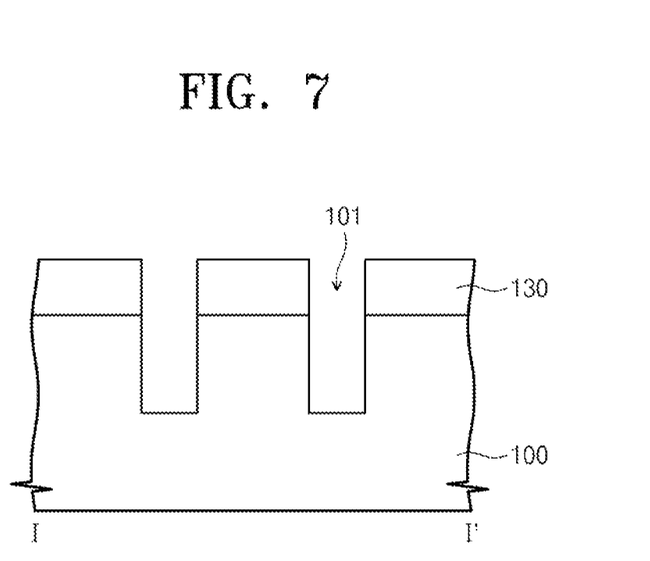
FIGS. 7 to 13 represent the process of forming an optical waveguide on bulk silicon wafer according to an embodiment of the inventive concept.

Referring to FIGS. 1 and 7, it is possible to form a pair of first trenches 101 on a surface of the substrate 100 (e.g., bulk silicon wafer). For example, the first trenches 101 may be formed by the etching of the substrate 100 through an anisotropic etching process using a mask 130. The first trenches 101 may be formed at an interval in the second direction D2 intersecting the first direction D1. The first trenches 101 may be extended in the first direction D1.

Figure 8:
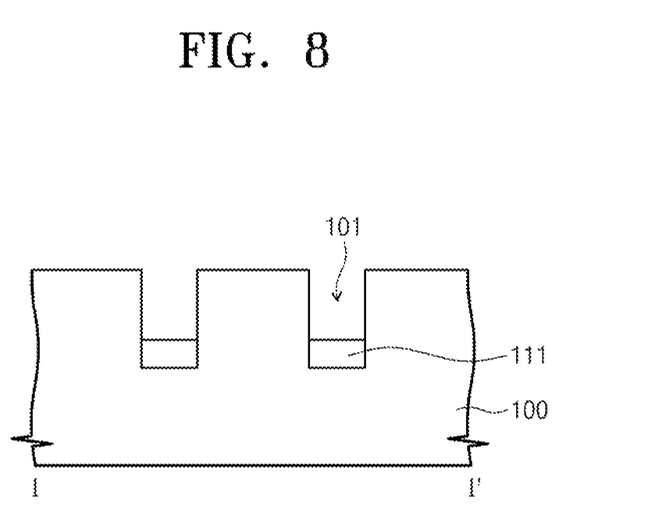

Referring to FIG. 8, it is possible to form oxide 111 in the lower portions of the first trenches 101. For example, by performing an etching process after the deposition of oxide in the first trenches 101, it is possible to remain the oxide 111 only in the lower portions of the first trenches 101.

Figure 9:
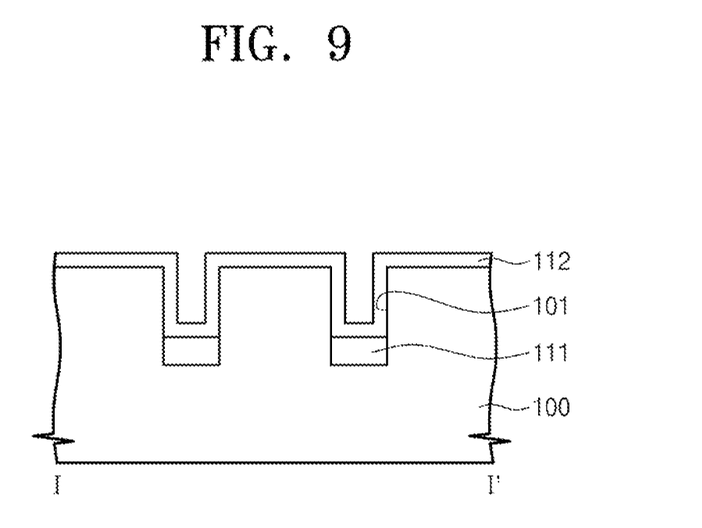
Figure 10:
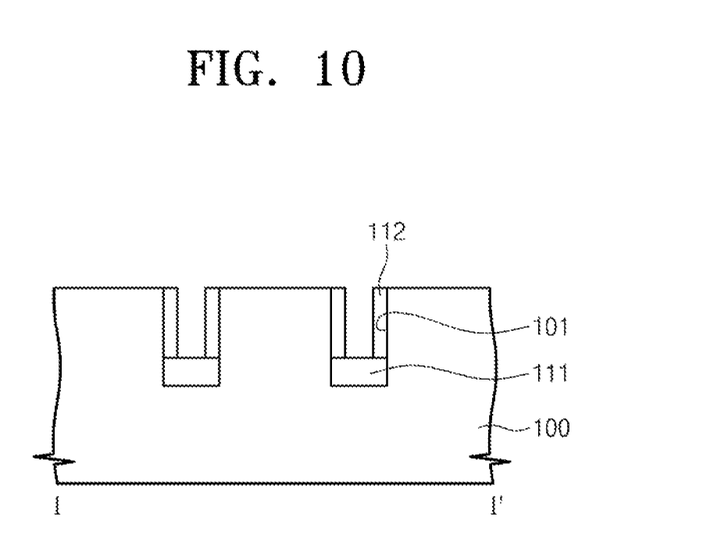

Referring to FIGS. 9 and 10, it is possible to form poly silicon 112 on the sidewalls of the first trenches 101. For example, the poly silicon 112 may be deposited by a chemical vapor deposition (CVD) process and formed by an etching process. By the deposition thickness of the poly silicon 112, the shapes and sizes of the first clad layer 110 and the optical waveguide core layer 210 may be determined.

Figure 11:
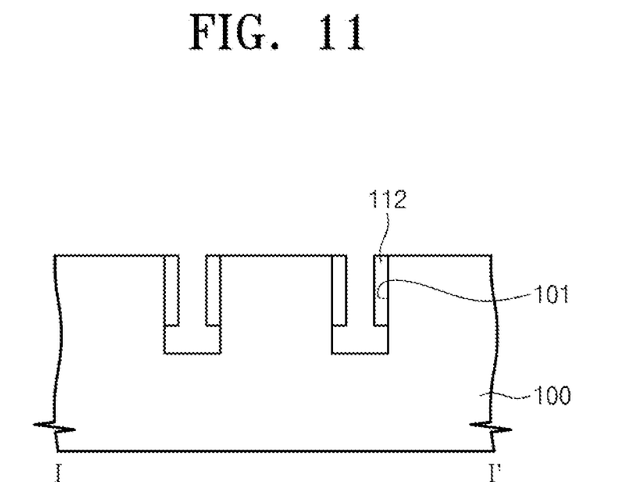

Referring to FIG. 11, it is possible to remove the oxide 111. For example, it is possible to remove the oxide 111 by performing a wet etching process.

Figure 12:
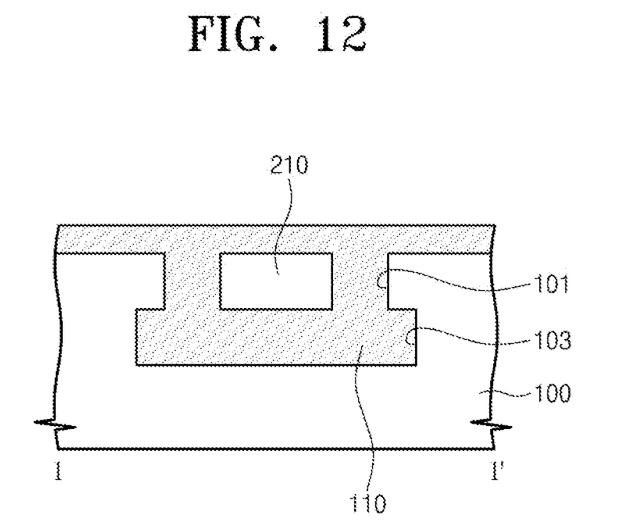
Figure 13:
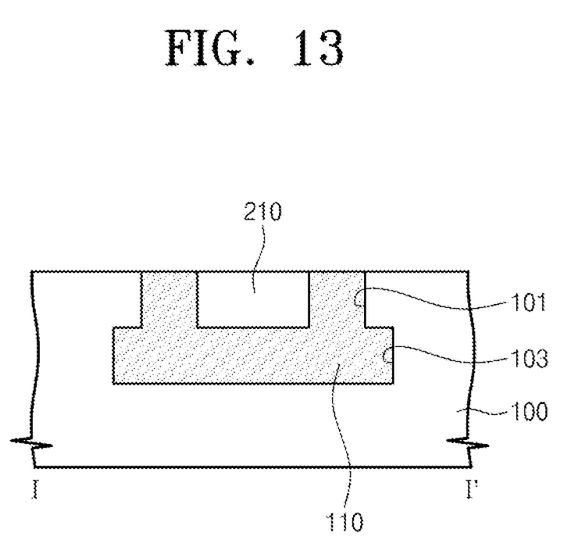

Referring to FIGS. 12 and 13, it is possible to form an oxide film by performing an oxidation process on the substrate 100. For example, the oxidation process may be a thermal oxidation process. For example, the second trench 103 connecting the first trenches 101 may be formed in the substrate 100 during the oxidation process. It is possible to perform planarization on the oxide film. Thus, an oxide film that fills the first trenches 101 and the second trench 103 may be formed to work as the first clad layer 110. The substrate on the first trenches 101 and the second trench 103 may become the optical waveguide core layer 210.

Referring back to FIGS. 2 and 3, the optical modulation part 200 is formed on the optical waveguide core layer 210. It is possible to form the first contact layer 201 by implanting impurities into the upper surface of the optical waveguide core layer 210. For example, the impurities implanted into the upper surface of the optical waveguide core layer 210 may be an n type semiconductor dopant. The depletion layer 202 is deposited on the first contact layer 201. For example, it is possible to form the depletion layer 202 on the first contact layer 201 by an epitaxial thin film growth process. It is possible to form the second contact layer 203 by implanting impurities into the upper surface of the depletion layer 202. For example, the impurities implanted into the upper surface of the depletion layer 202 may be a p type semiconductor dopant.

The second clad layer 120 is formed on the optical modulation part 200 and the optical waveguide core layer 210. For example, the second clad layer 120 may deposit and form silicon oxide by the CVD process. By etching some regions of the second clad layer 120, openings that expose the first contact layer 201 and the second contact layer 203 are formed. The first electrode 240a may be formed by the opening that exposes the first contact layer 201. The second electrode 240b may be formed by the opening that exposes the second contact layer 203.

For example, the first electrode 240a may be in electrical contact with the second contact layer 203 through the opening. For example, the second electrode 240b may be in electrical contact with the first contact layer through the opening.

It is possible to form the electro-absorption optical modulation device on a bulk silicon wafer only with a fundamental semiconductor device fabrication process and a thermal oxide film formation process, without using an expensive SOI wafer. By fabricating an SOI structure locally in a required region only, it is possible to achieve the high integration of various devices on an IC and secure the stability of a structure, without using the expensive SOI wafer.

While embodiments of the inventive concept are described with reference to the accompanying drawings, a person skilled in the art may understand that the inventive concept may be practiced in other particular forms without changing technical spirits or essential characteristics. Therefore, embodiments described above should be understood as illustrative and not limitative in every aspect.

What is claimed is:

1. An electro-absorption optical modulation device comprising:
   a semiconductor substrate;
   a first clad layer disposed in a trench in the semiconductor substrate;
   an optical waveguide core layer disposed on the first clad layer in the trench, the optical waveguide core layer extending in a first direction and being horizontally spaced apart from sides of the trench by the first clad layer;
   an optical modulation part stacked on an upper surface of the optical waveguide core layer, the optical modulation part having an island shape; and
   a second clad layer covering the optical modulation part and being disposed above the optical waveguide core layer.

2. The electro-absorption optical modulation device of claim 1, wherein the semiconductor substrate comprises a bulk silicon wafer.

3. The electro-absorption optical modulation device of claim 1, wherein the optical modulation part comprises:
   a first contact layer;
   a depletion layer on the first contact layer; and
   a second contact layer on the depletion layer.

4. The electro-absorption optical modulation device of claim 3, wherein the first contact layer extends outside of the depletion layer.

5. The electro-absorption optical modulation device of claim 3, wherein the first contact layer comprises a first semiconductor pattern.

6. The electro-absorption optical modulation device of claim 3, wherein the second contact layer comprises a second semiconductor pattern.

7. The electro-absorption optical modulation device of claim 3, wherein the depletion layer comprises germanium (Ge) or silicon germanium (SiGe).

8. The electro-absorption optical modulation device of claim 1, wherein a width of the optical modulation part in a second direction is smaller than a width of the first clad layer in the second direction.

9. The electro-absorption optical modulation device of claim 1, wherein the first clad layer and the second clad layer surround the optical modulation part and the optical waveguide core layer.

10. The electro-absorption optical modulation device of claim 1, wherein each of the first clad layer and the second clad layer comprises silicon oxide or silicon nitride.

11. The electro-absorption optical modulation device of claim 1, wherein the optical waveguide core layer comprises single crystal silicon.

12. The electro-absorption optical modulation device of claim 1, wherein the first clad layer is disposed against a lower surface of the optical waveguide core layer, and disposed against side surfaces of the optical waveguide core layer.

13. The electro-absorption optical modulation device of claim 1, wherein the optical modulation part comprises:
   a first contact layer disposed directly on an upper surface of the optical waveguide core layer;
   a depletion layer disposed directly on an upper surface of the first contact layer; and
   a second contact layer disposed directly on an upper surface of the depletion layer, and
   wherein the first contact layer is disposed between the optical waveguide core layer and the depletion layer.

14. The electro-absorption optical modulation device of claim 1, wherein a horizontal width of the optical modulation part is the same as a horizontal width of the optical waveguide core layer.

15. The electro-absorption optical modulation device of claim 1, further comprising:
   a first electrode disposed on an upper surface of the optical modulation part, the optical modulation part being stacked between the first electrode and the optical waveguide core layer.

* * * * *